United States Patent [19]

Sato

[11] Patent Number: 5,491,523
[45] Date of Patent: Feb. 13, 1996

[54] IMAGE MOTION VECTOR DETECTING METHOD AND MOTION VECTOR CODING METHOD

[75] Inventor: Akihiro Sato, Osaka, Japan

[73] Assignee: Matsushita Electric Industrial Co. Ltd., Osaka, Japan

[21] Appl. No.: 251,352

[22] Filed: May 31, 1994

[30] Foreign Application Priority Data

Jun. 1, 1993 [JP] Japan .................................. 5-130838

[51] Int. Cl.$^6$ ........................................................ H04N 7/50
[52] U.S. Cl. ........................ 348/699; 348/402; 348/398
[58] Field of Search ........................................ 348/394, 402, 348/407, 413, 416, 699; H04N 7/137, 7/50

[56] References Cited

U.S. PATENT DOCUMENTS

| | | | |
|---|---|---|---|
| 5,006,929 | 4/1991 | Barbero et al. | 348/407 |
| 5,134,477 | 7/1992 | Knauer et al. | 348/699 |
| 5,347,308 | 9/1994 | Wai | 348/394 |

FOREIGN PATENT DOCUMENTS

| | | |
|---|---|---|
| 5-068244 | 3/1993 | Japan . |
| 5-111016 | 4/1993 | Japan . |
| 5-091498 | 4/1993 | Japan . |
| 5-161129 | 6/1993 | Japan . |

*Primary Examiner*—Howard W. Britton
*Attorney, Agent, or Firm*—Willian Brinks Hofer Gilson & Lione

[57] ABSTRACT

In a motion vector detection method for detecting motion vectors for respective blocks divided from an image frame, a motion vector is detected for a block of a luminance signal forming the image frame together with at least one chrominance signal, a reference motion vector is defined with respect to the corresponding block of the chrominance signal based on the motion vector detected, plural candidate motion vectors are set around the reference motion vector, the correlation between two blocks of adjacent frames is detected for each of the candidate motion vectors and a motion vector with the greatest correlation is defined as the motion vector of the chrominance signal. The present method is also applicable to the sub-band processing method of the moving image signal.

5 Claims, 9 Drawing Sheets

IMAGE MOTION VECTOR DETECTING METHOD AND MOTION VECTOR CODING METHOD

BACKGROUND OF THE INVENTION

1. Field of the Invention

The present invention relates to a motion vector detecting method for detecting the motion vector expressing the direction and rate of motion in each part of an image, and to a motion vector coding method for coding the detected motion vector.

2. Description of the Prior Art

One method often used for coding moving images is the inter-frame predictive coding method for coding using time-based redundancy, a feature of moving images. However, when parts of an image have moved greatly, the characteristics of inter-frame predictive coding cannot be well applied. To compensate for this, motion-compensated inter-frame predictive coding whereby the motion vectors of each part of the image are detected for motion compensation is used.

To code an image signal, the signal is separated into its luminance signal (Y) and chrominance signal (C) components for discrete processing. Normally, motion vector detection is applied only to the luminance signal component, and the chrominance signal motion vector is the motion vector position-corrected with respect to the motion vector detected in the luminance signal component.

An example of the motion vector detection method applied to the chrominance signal in a conventional motion vector detection method is shown in FIG. 5 and described below. It is assumed below that the sampling frequency ratio between the luminance signal Y and the two chrominance signals $C_1$ and $C_2$ is 4:1:1. To detect the motion vector, the image frame is divided into N blocks (where N is a natural number), and motion vector detection is applied to each of these blocks. If the ratio between the luminance signal Y and chrominance signals $C_1$, $C_2$ is 4:1:1 and the size of the luminance signal Y block is 16×16, the size of each chrominance signal $C_1$, $C_2$ block is 8×8.

Processing of block A__Y in the luminance signal Y is considered below. The first step in motion vector detection is to obtain the correlation between adjacent frames; the vector with the greatest correlation is defined as the motion vector of that block. FIG. 5 shows a case wherein the correlation with the previous frame is obtained to detect the motion vector. In FIG. 5 block A__Y is the target block A__Y in the current frame of the luminance signal Y, block A'__Y is the target block in the previous frame of the luminance signal Y, block A__$C_1$ is the target block of the current frame in chrominance signal $C_1$, block A'__$C_1$ is the target block of the previous frame in chrominance signal $C_1$, block A__$C_2$ is the target block of the current frame in chrominance signal $C_2$, and block A'__$C_2$ is the target block of the previous frame in chrominance signal $C_2$.

It is further assumed that motion vector 3 detected in block A__Y indicates movement of +4 in the horizontal direction and +6 in the vertical direction. In this conventional method, motion vector 3 obtained from the luminance signal Y is position corrected for the chrominance signal to obtain motion vectors 4 and 5 of chrominance signals $C_1$ and $C_2$. More specifically, motion vectors 4, 5 of blocks A__$C_1$, A__$C_2$ of chrominance signals $C_1$, $C_2$ corresponding to block A__Y of the luminance signal Y are +2 horizontally and +3 vertically, or one-half of the luminance signal Y motion vector 3 values. (See "Video chapter of ISO 11172 MPEG CD", ISO/IEC JTC1/SC2/WG11 MPEG 91/090, May, 1991.)

FIG. 6 is a block diagram of a conventional coding apparatus utilizing a motion vector of luminance signal Y. In the figures, like elements are identified by the same element numbers.

Input luminance signal Y is input to motion vector detector 31 to detect a motion vector regarding luminance signal Y for each block of a frame.

The motion vector detected by motion vector detector 31 is applied to motion compensation circuit 37 for motion-compensating each block stored in frame memory 36. Input luminance signal Y is subtracted by the motion-compensated signal at a subtractor and, then, applied to discrete cosine transformer (DCT) 32, and further, quantized by quantizer 33. The quantized luminance signal is input to variable-length coding (VLC) means 38.

Simultaneously, the quantized luminance signal is applied to inverse quantizer 34 and the inversion-quantized signal is input to inverse DCT 35. The inversion-DC transformed signal is added to the motion-compensated signal at an adder and, then, stored in frame memory 36.

The motion vector detected by motion vector detector 31 is further input to position correction circuit 39 to obtain a motion vector of a chrominance signal. The motion vector obtained by position correction circuit 39 is applied to motion-compensation circuit 42 to correct the chrominance signal stored in frame memory 43. The chrominance signal corrected using the motion vector is applied to a subtractor to subtract the input chrominance signal. Namely, the input chrominance signal is corrected based on the motion vector of luminance signal Y detected by the motion vector detector 31. The subtracted chrominance signal is discrete-cosine transformed by DCT 44 and quantized by quantizer 45. The quantized chrominance signal is coded by VLC 48 and, then, multiplexed with the quantized and variable-length coded luminance signal by multiplexer 40 to obtain a bit stream.

With this conventional motion vector detection method, however, the motion vectors of the chrominance signals are dependent on the luminance signal motion vector, and the chrominance signal motion vectors are not precisely or specifically detected.

In addition, while it is possible to accurately detect the chrominance signal motion vectors using the same method applied to the luminance signal, as shown in FIG. 7, problems are presented by the increase in the number of operations and the additional information, and the inability to improve the coding characteristics commensurate with the increase in the scale of the hardware.

A sub-band coding method whereby the image signal is divided by a frequency band dividing filter into plural frequency bands, and each frequency band division is coded, transferred, and stored is described next. The advantage of this sub-band coding method is that different coding methods can be used according to the signal properties of each band signal, and parallel processing of each band is possible.

FIG. 8 is a block diagram of an apparatus applying the conventional sub-band coding method. As shown in the figure, this apparatus comprises low pass filters 11, 51 and 61 high pass filters 12, 52 and 62 down samplers 13, 53, 63, 73, 83, and 93 an LL band coding circuit 14, an LH band coding circuit 15, an HL band coding circuit 16, an HH band coding circuit 17, a variable length coding circuit 18(a–d), a multiplexer 19 and a motion vector detector 20.

In the conventional sub-band coding method, the frequency band of the input signal is first divided in two horizontally by the low pass filter 11 and high pass filter 12, and is then similarly divided in two vertically as shown in FIG. 8. Four band signals are obtained as a result: the horizontal low band and vertical low band signal is called the LL band, the horizontal low band and vertical high band signal is called the LH band, the horizontal high band and vertical low band signal is called the HL band, and the horizontal high band and vertical high band signal is called the HH band. The output from each band pass filter is then down-sampled 2:1 by the corresponding down sampler 53, 63, 73, 93.

The LL band has the highest power level and is the most important component. It is therefore coded by motion compensation (MC), discrete cosine transformation (DCT) and quantization at LL band coding means 14, and the H bands (LH, HL, HH bands) are coded by a combination of MC and quantization atLH, HL and HH band coding means 15, 16 and 17, respectively. Motion vector detection is applied only to the LL band, and the motion vector detected from the LL band is used for the other H bands. This is because applying the same motion vector detection used with the LL band to the H bands, as shown in FIG. 9, increases the number of operations and added information, and an improvement in coding characteristics commensurate with the increase in the scale of the hardware required cannot be obtained.

The signals quantized in each band are then coded by the corresponding variable length coding circuit 18. The four band signals are then multiplexed into a single bit stream by the multiplexer 19. (See PCSJ91, 7–3, pp. 173–175.)

The problem with this conventional motion vector detection method is that the motion vectors of the H bands are. dependent upon the motion vector of the LL band, and the H band motion vectors are not accurately detected.

SUMMARY OF THE INVENTION

Therefore, the first object of the present invention is to provide a motion vector detection method and a motion vector coding method for more accurately detecting the motion vectors of the chrominance signals while reducing the increase in the number of operations, added information, and hardware scale required compared with motion vector detection methods using the same method used for luminance signal motion vector detection.

The second object of the present invention is to provide a motion vector detection method and a motion vector coding method for more accurately detecting the H band motion vectors while reducing the increase in the number of operations, added information, and hardware scale required compared with H band motion vector detection methods using the same method used for LL band motion vector detection.

To achieve the first object of the invention, a motion vector detection method according to the present invention uses a motion vector obtained from the block of the luminance signal corresponding to the target block of the chrominance signal when obtaining the motion vector of the chrominance signal. When the pixel sizes of the luminance signal image frame and the chrominance signal image frame are the same, the reference motion vector is defined as the motion vector obtained from the luminance signal block. When said pixel sizes are different, the motion vector obtained from the luminance signal block is position-corrected for chrominance signal use, and the position-corrected motion vector is defined as the reference motion vector. Plural candidate motion vectors are then set around the reference motion vector, the correlations between the reference motion vectors and the plural candidate motion vectors in adjacent frames are obtained, and the motion vector with the greatest correlation is defined as the motion vector of the chrominance signal.

In addition, the motion vector coding method according to the present invention obtains the difference between the motion vector of the chrominance signal and the position-corrected reference motion vector, and codes the difference value when coding the motion vector of the chrominance signal detected by the above motion vector detection method.

To achieve the second object of the invention, a motion vector detection method according to the present invention uses the motion vector obtained from the block of the LL band corresponding to the target block of the H band when obtaining the motion vectors of the H bands. When the pixel sizes of the LL band image frame and the H band image frame are the same, the reference motion vector is defined as the motion vector obtained from the LL band block. When said pixel sizes are different, the motion vector obtained from the LL band block is position-corrected for H band use, and the reference motion vector is defined as the position-corrected motion vector. Plural candidate motion vectors are set around the reference motion vector in each H band, the correlations between the reference motion vectors and the plural candidate motion vectors in adjacent frames are obtained, and the motion vector with the greatest correlation is defined as the motion vector in each H band.

In addition, the motion vector coding method according to the present invention obtains the difference between the motion vector of the H band and the position-corrected reference motion vector, and codes the difference value when coding the H band motion vectors detected by the above motion vector detection method.

The motion vector of the chrominance signal can be more accurately detected by means of the first embodiment of the invention because the motion vector with the greatest correlation between frames is selected from among the reference motion vector and plural candidate motion vectors and defined as the motion vector of the chrominance signal. In addition, the increase in operations and hardware scale can be reduced compared with chrominance signal motion vector detection methods applying the same method used in luminance signal motion vector detection.

The amount of added information can also be reduced when coding the chrominance signal motion vector because it is the difference between the chrominance signal motion vector and the reference motion vector that is obtained and coded.

In addition, the motion vector of the H band can be more accurately detected by means of the second embodiment of the invention because the motion vector with the greatest correlation between frames is selected from among the reference motion vector and plural candidate motion vectors and defined as the motion vector of each H band. In addition, the increase in operations and hardware scale can be reduced compared with H band motion vector detection methods applying the same method used in LL band motion vector detection.

The amount of added information can also be reduced when coding the H band motion vector because it is the difference between the H band motion vector and the reference motion vector that is obtained and coded.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 1:
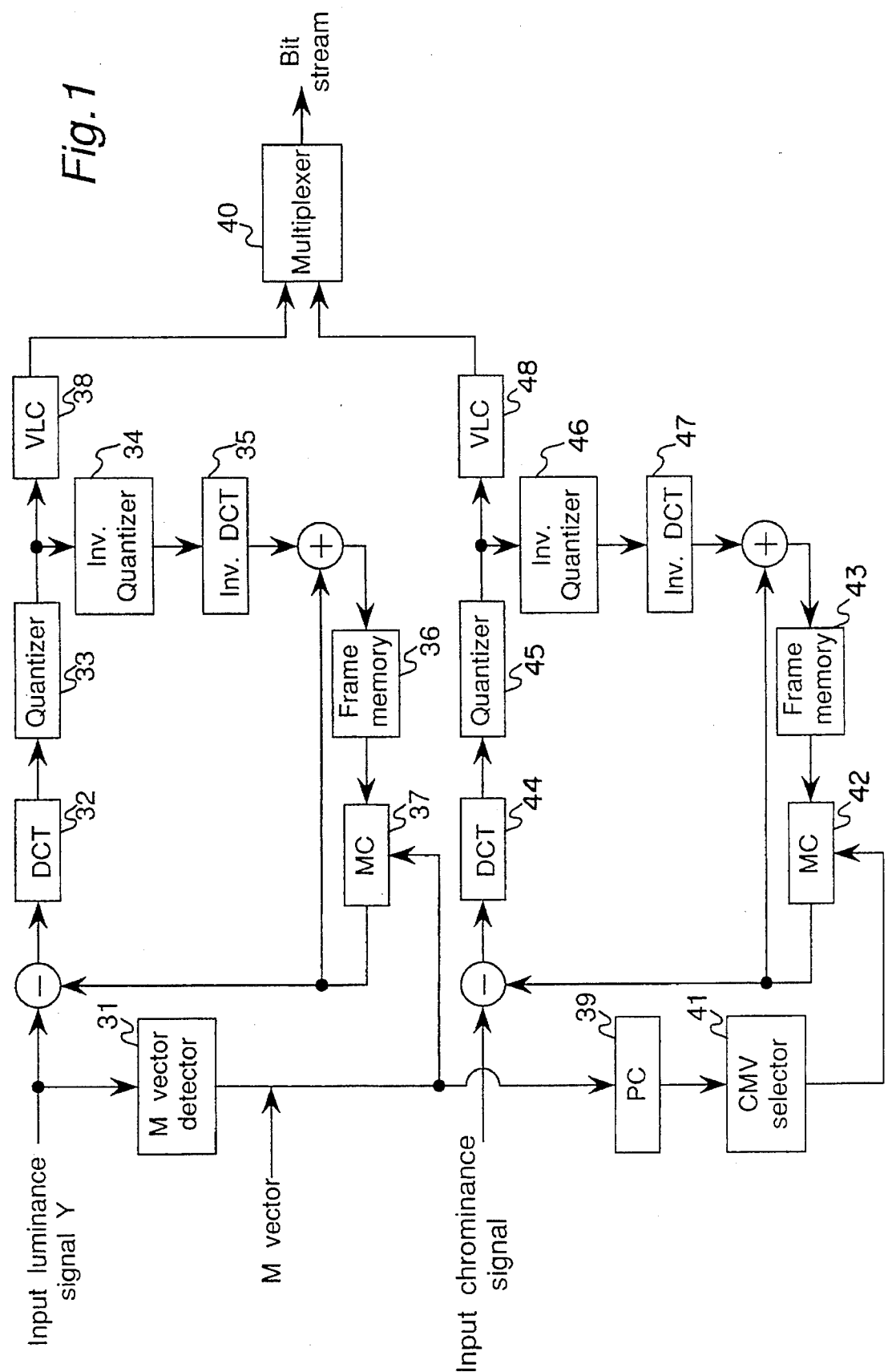
FIG. 1 is a block diagram for detecting a motion vector of a chrominance signal according to a preferred embodiment of the present invention.

FIG. 1 is a block diagram of a coding apparatus according to a first preferred embodiment of the present invention.

Figure 6:
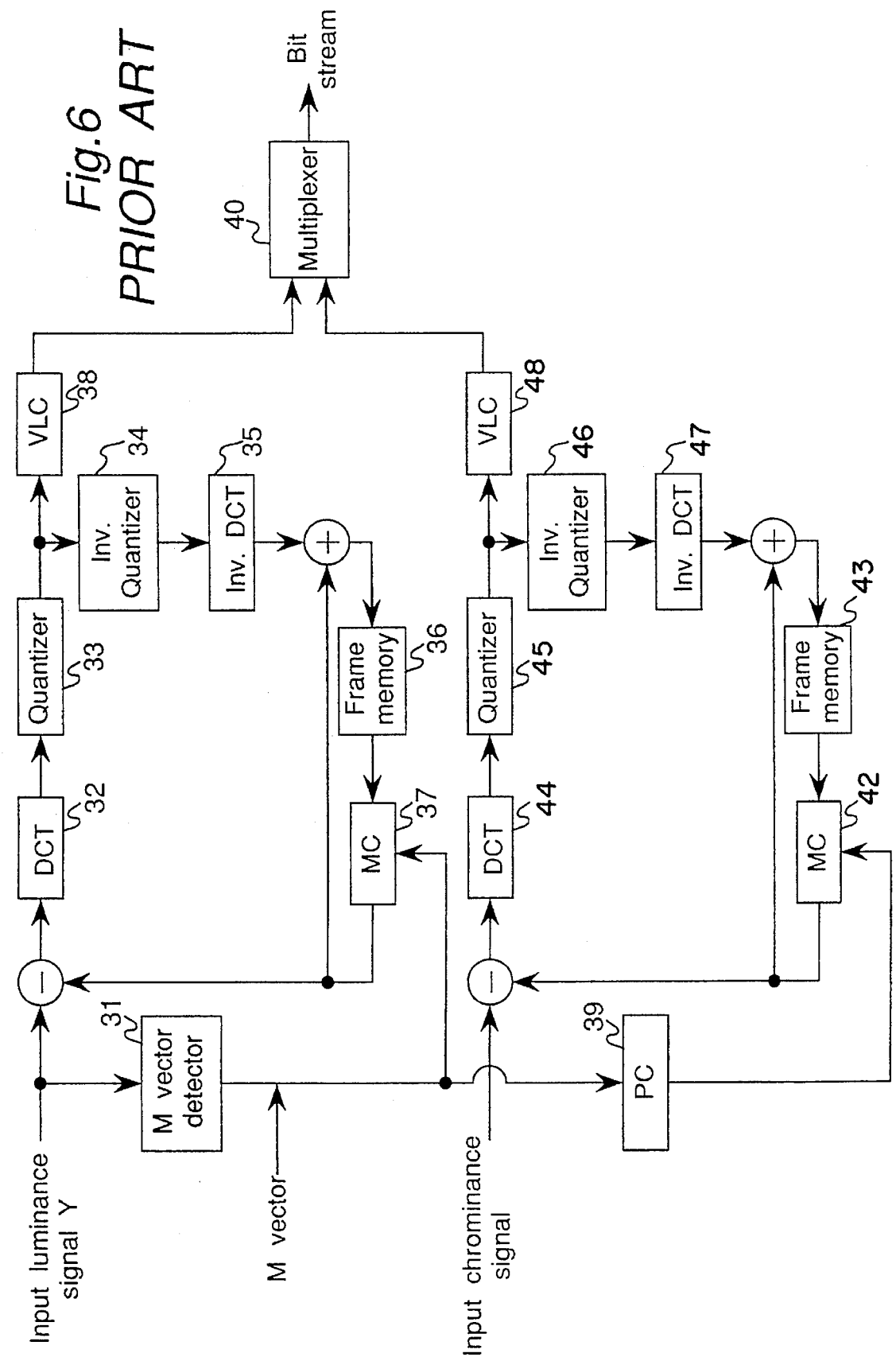
FIG. 6 is a block diagram of a conventional encoder for a moving image signal.
Figure 7:
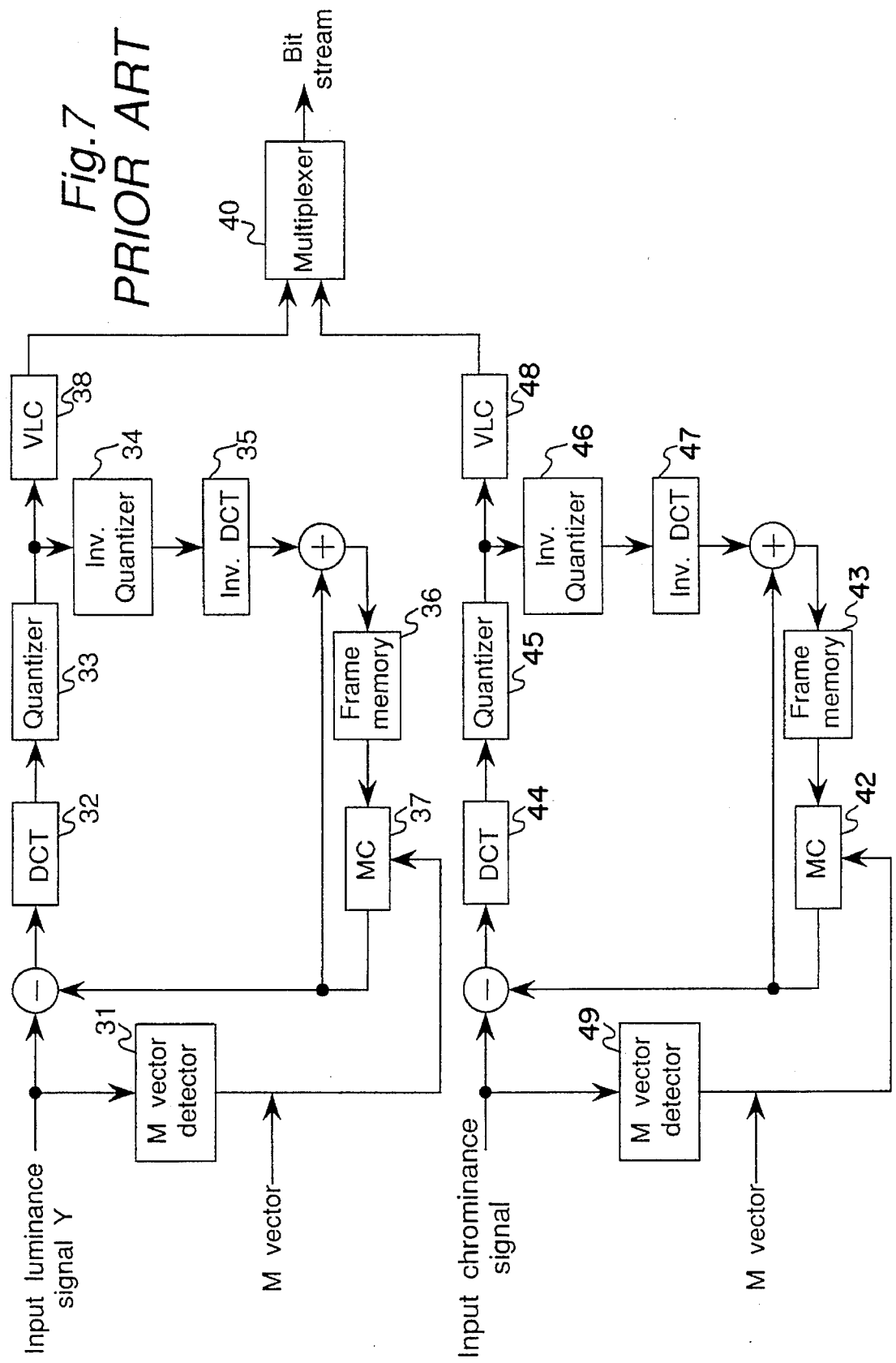
FIG. 7 is a block diagram of another conventional encoder for a moving image signal.

As is apparent from comparison of FIG. 1 with FIG. 6 showing a prior art, the present coding apparatus provides a candidate motion vector selector 41 for determining the most probable motion vectors among candidate motion vectors selected based on a motion vector of luminance signal Y detected by motion vector detector 31. The motion vector selected by candidate motion vector selector 41 is utilized at motion compensation (MC) means 42 for motion-compensating a chrominance signal stored in frame memory 43. Other circuits shown in FIG. 1 are substantially same as those illustrated in FIG. 6 and, accordingly, further explanation thereabout is omitted to avoid duplicate explanation.

Figure 2:
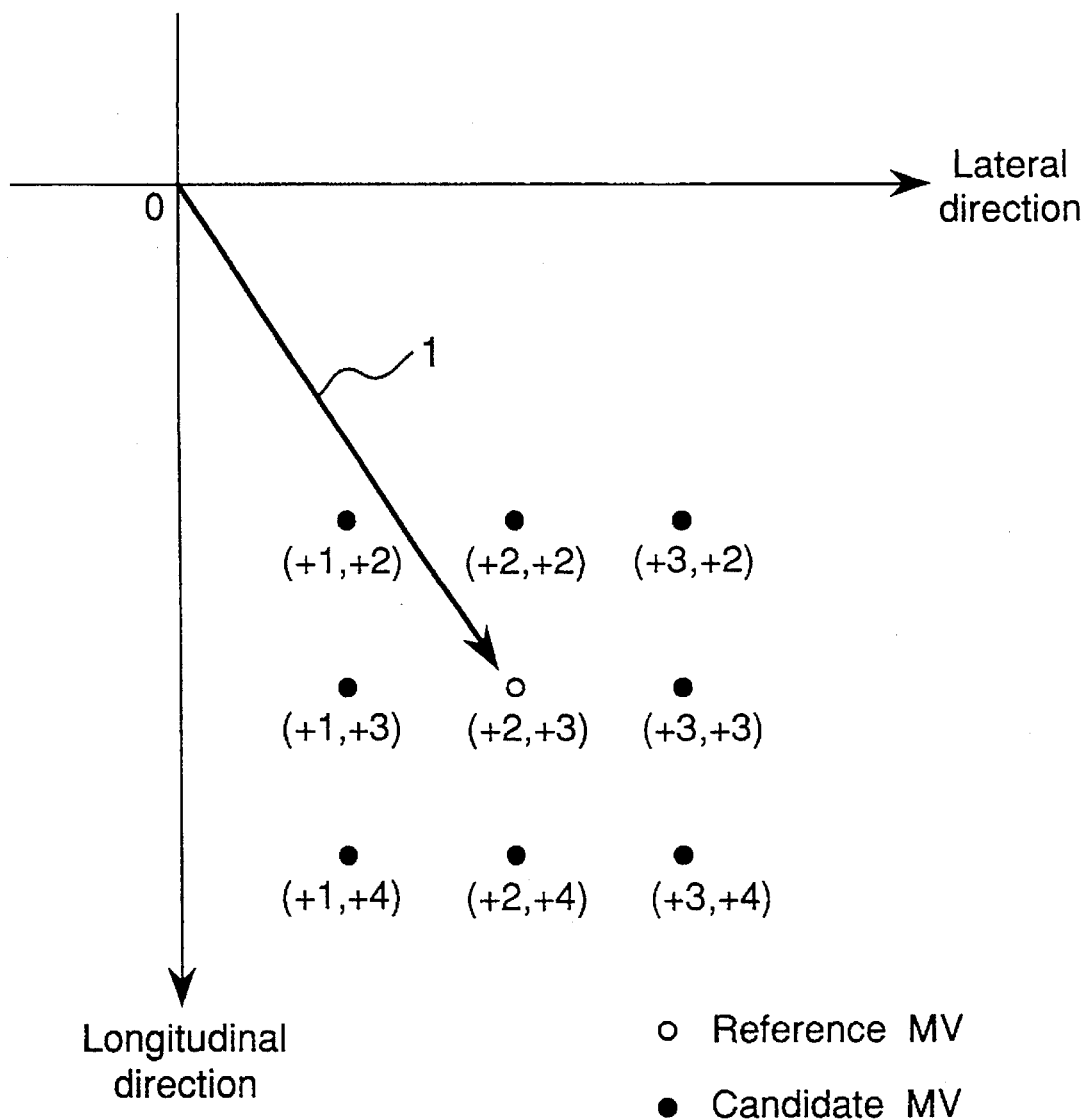
FIG. 2 is an explanatory view for showing a method for detecting a motion vector in a chrominance signal.

FIG. 2 is used below to describe the method of detecting the motion vector of the chrominance signal according to the preferred embodiment of the invention which is performed by candidate motion vector selector 41 shown in FIG. 1. It is assumed below that the sampling frequency ratio between the luminance signal Y and the two chrominance signals $C_1$ and $C_2$ is 4:1:1.

To detect the motion vector, the image frame is divided into N blocks (where N is a natural number), and motion vector detection is applied to each of these blocks. The motion vector detection precision is one pixel. If the ratio between the luminance signal Y and chrominance signals $C_1$, $C_2$ is 4:1:1 and the size of the luminance signal Y block is 16×16 pixels, the size of each block in the chrominance signals $C_1$, $C_2$ is 8×8 pixels.

It is further assumed, for example, that the motion vector detected in the luminance signal Y indicates movement of +4 in the horizontal direction and +6 in the vertical direction. Then, as shown in FIG. 2, reference motion vector 1 in chrominance signals $C_1$, $C_2$ is the motion vector obtained for the luminance signal Y position-corrected for chrominance signal use, resulting in horizontal and vertical movement values of +2 and +3, respectively. Candidate motion vectors are then set at eight adjacent points (±1 horizontally or vertically) around the reference motion vector 1 in both chrominance signals $C_1$, $C_2$. The correlations between the reference motion vectors 1 and the eight candidate motion vectors in each of the chrominance signals $C_1$, $C_2$ is then obtained in adjacent frames. The motion vector with the greatest correlation is then determined and defined as the motion vector of the chrominance signal $C_1$ or $C_2$.

The method of coding the motion vectors of the chrominance signals $C_1$, $C_2$ is described next.

The reference motion vector 1, which is the motion vector detected in the luminance signal Y position-corrected for chrominance signal use, is expressed by horizontal YX and vertical YY values. The motion vector detected in chrominance signal $C_1$ is expressed by horizontal $C_1X$ and vertical $C_1Y$ values. Similarly, the motion vector detected in chrominance signal $C_2$ is expressed by horizontal $C_2X$ and vertical $C_2Y$ values. If the detected motion vectors were directly coded, the amount of added information would increase. However, because the motion vectors of chrominance signals $C_1$, $C_2$ take values ranging from −1−+1 horizontally and −1−+1 vertically relative to the reference motion vector 1, it is possible to obtain the difference between the motion vectors of the chrominance signals $C_1$, $C_2$ and the reference motion vector 1, and code the difference. This reduces the amount of added information. The differences in the motion vectors of the chrominance signals $C_1$, $C_2$ can be obtained by the following equations $DC_1X=C_1X-YX$ $(-1 \leq DC_1X \leq +1)$ $DC_1Y=C_1Y-YY$ $(-1 \leq DC_1Y \leq +1)$ $DC_2X=C_2X-YX$ $(-1 \leq DC_2X \leq +1)$ $DC_2Y=C_2Y-YY$ $(-1 \leq DC_2Y \leq +1)$ where $DC_1X$ and $DC_1Y$ are the horizontal and vertical differences, respectively, in chrominance signal $C_1$, and $DC_2X$ and $DC_2Y$ are the horizontal and vertical differences, respectively, in chrominance signal $C_2$.

As described above, when obtaining the chrominance signal motion vector, the motion vector obtained from the luminance signal block corresponding to the target block of the chrominance signal is used. When the pixel sizes of the luminance signal image frame and the chrominance signal image frame are the same, the motion vector obtained from the luminance signal is used as the reference motion vector. When the pixel sizes are different, the motion vector obtained from the luminance signal block is position-corrected for chrominance signal use, and this position-corrected motion vector is used as the reference motion vector. Plural candidate motion vectors are then set around the reference motion vector, and the correlations between the reference motion vectors and the plural candidate motion vectors in adjacent frames are obtained. The motion vector with the greatest correlation is then defined as the motion vector of the chrominance signal. As a result, the motion vector of the chrominance signal can be more accurately detected, and the increase in the number of operations and the hardware scale can be reduced compared with chrominance signal motion vector detection methods applying the same method used to detect the luminance signal motion vector.

In addition, when coding the chrominance signal motion vector, the difference between the chrominance signal motion vector and the reference motion vector is obtained and the difference is coded, thereby reducing the amount of added information.

It is to be noted that the present invention shall not be limited to a 4:1:1 ratio between the luminance signal Y and chrominance signals $C_1$, $C_2$, a motion vector detection precision of one pixel, and eight candidate motion vectors as in the above embodiment, and numerous variations of these parameters are possible in accordance with the intent of the invention without being excluded from the scope of the invention.

Figure 3:
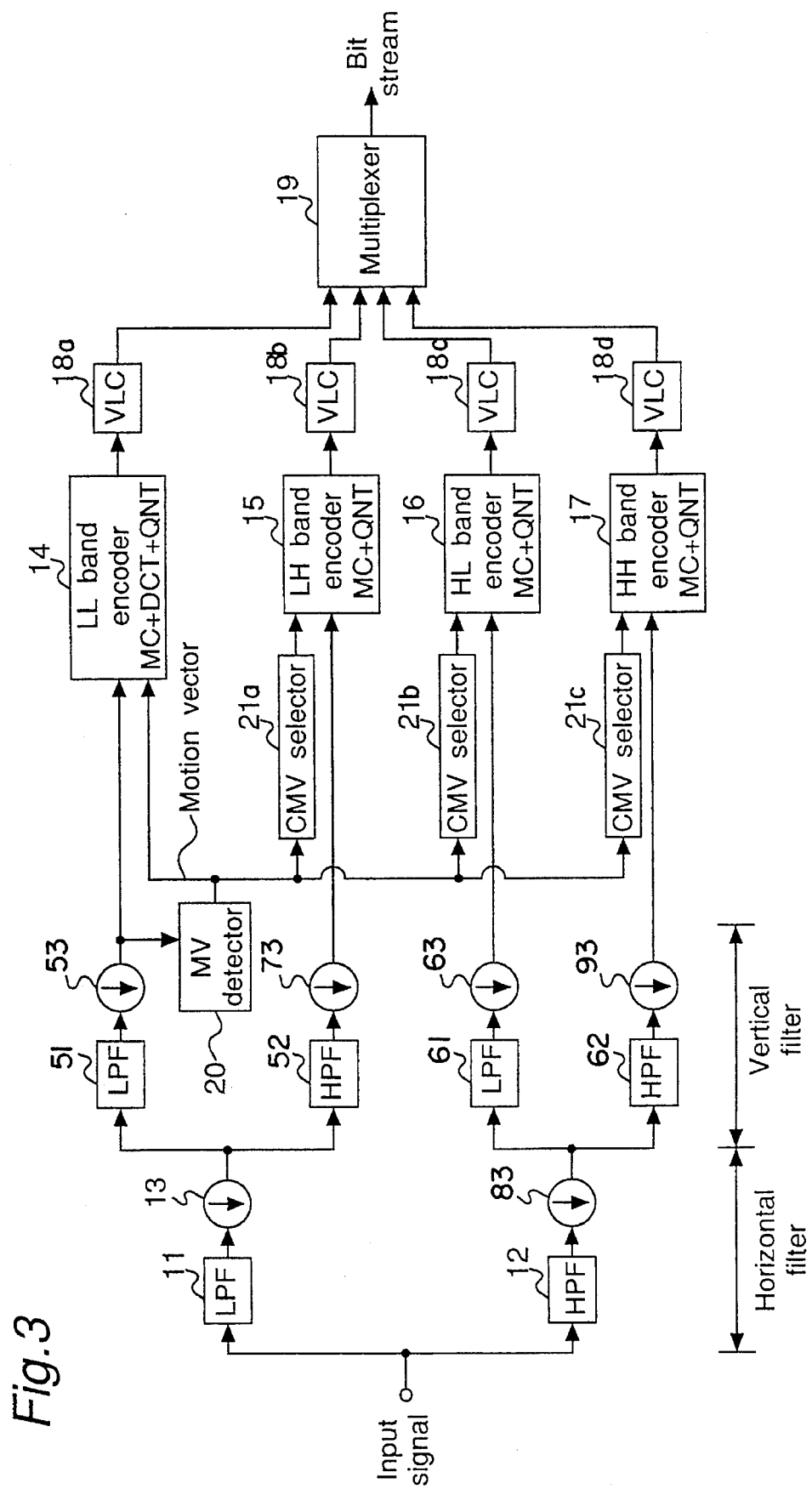
FIG. 3 is a block diagram for detecting a motion vector in H band according to a preferred embodiment of the present invention.

FIG. 3 is a block diagram of a sub-band coding apparatus according to a second preferred embodiment of the present invention.

Figure 8:
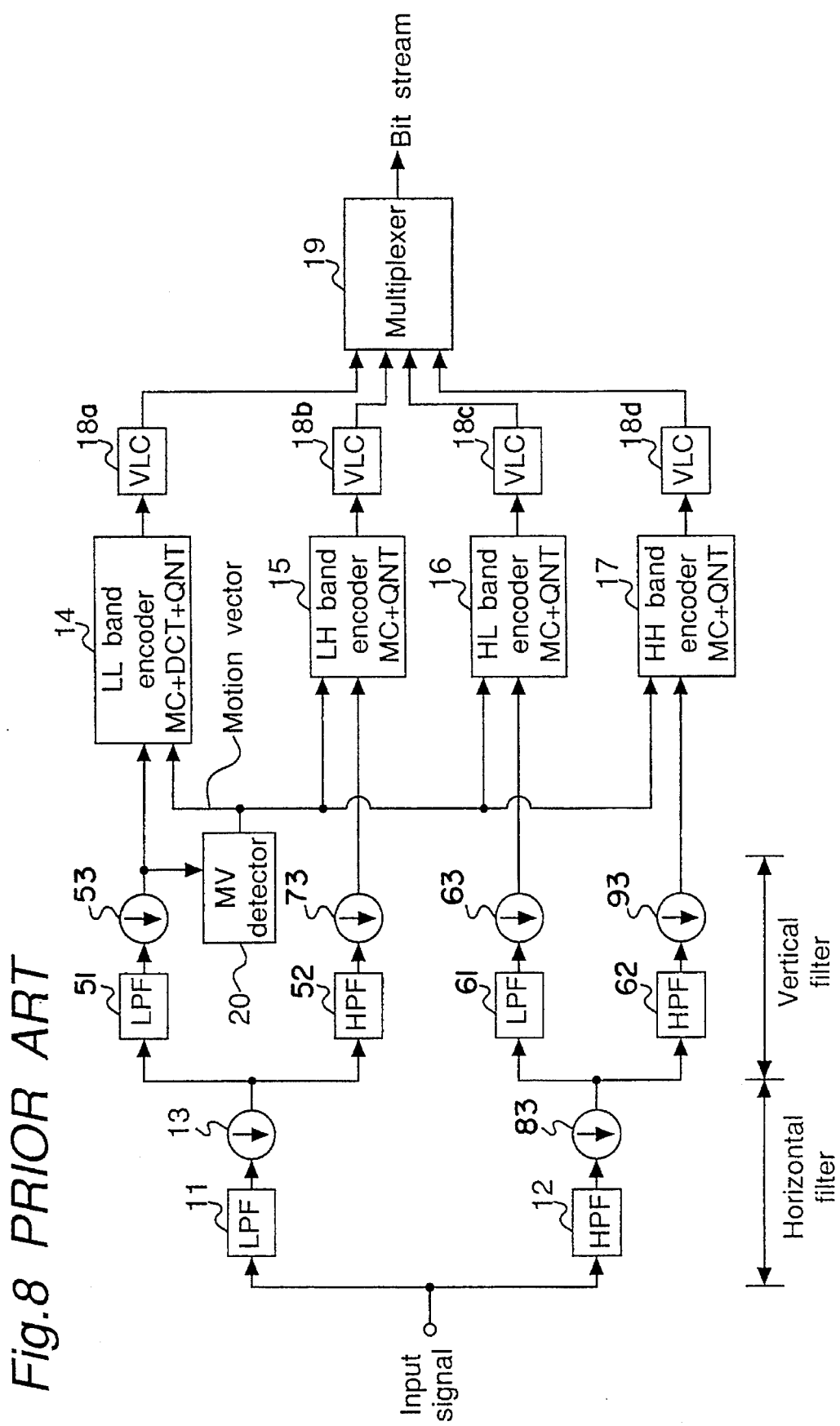
FIG. 8 is a block diagram of a conventional sub-band encoder for a moving image signal.
Figure 9:
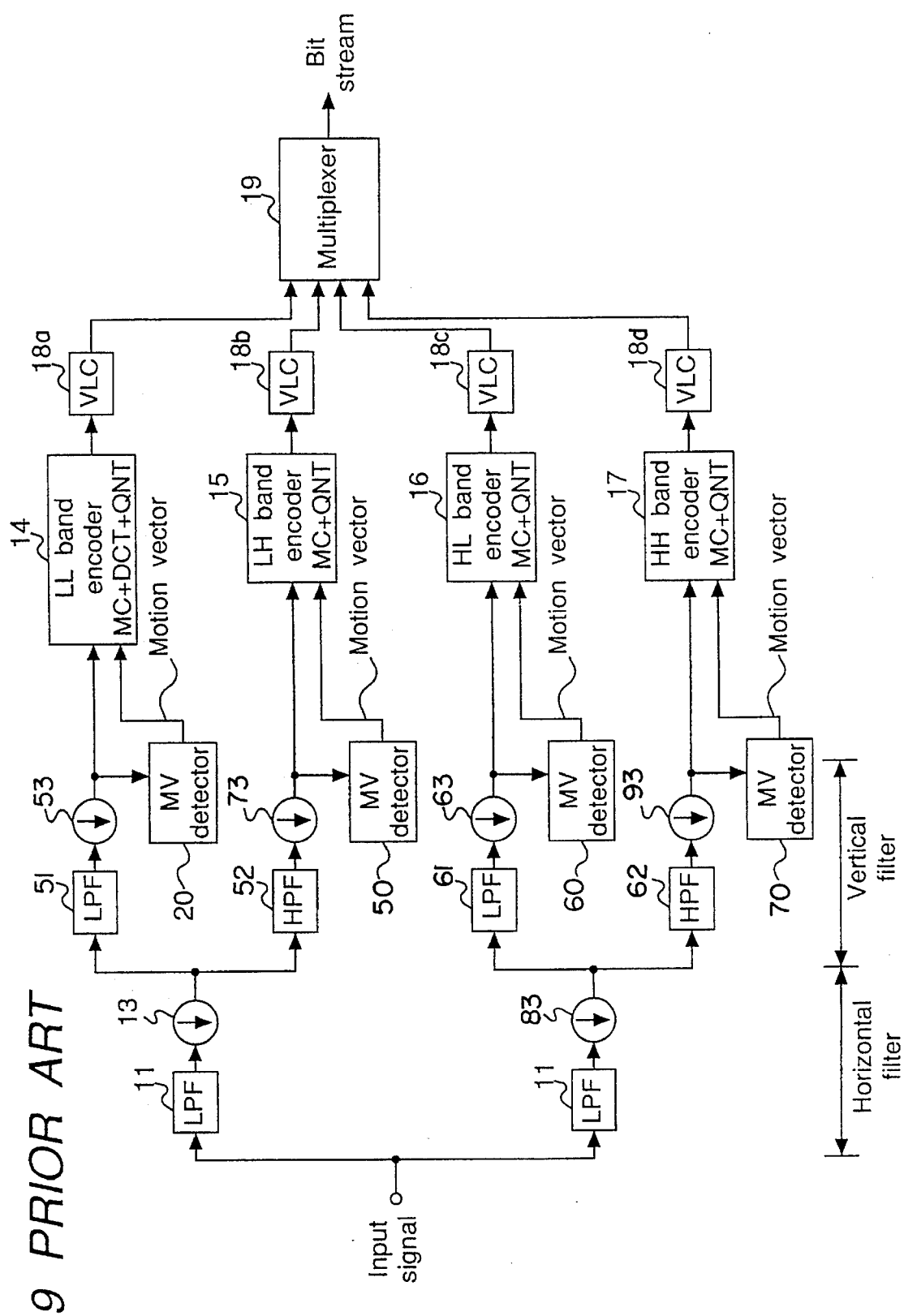
FIG. 9 is a block diagram of another conventional sub-band encoder for a moving image signal.

As is apparent from comparison of FIG. 3 with FIG. 8, the sub-band coding apparatus of the present invention provides three candidate motion vector selectors 21a–c for LH, HL and HH bands. Each candidate motion vector selector 21a–c receives a motion vector of LL band detected by motion vector detector 20 and determines the most probable motion vector according to a method explained hereafter. Other elements of FIG. 3 are same as those of FIG. 8 and, accordingly, further explanation thereabout is omitted to avoid duplicate description.

Figure 4:
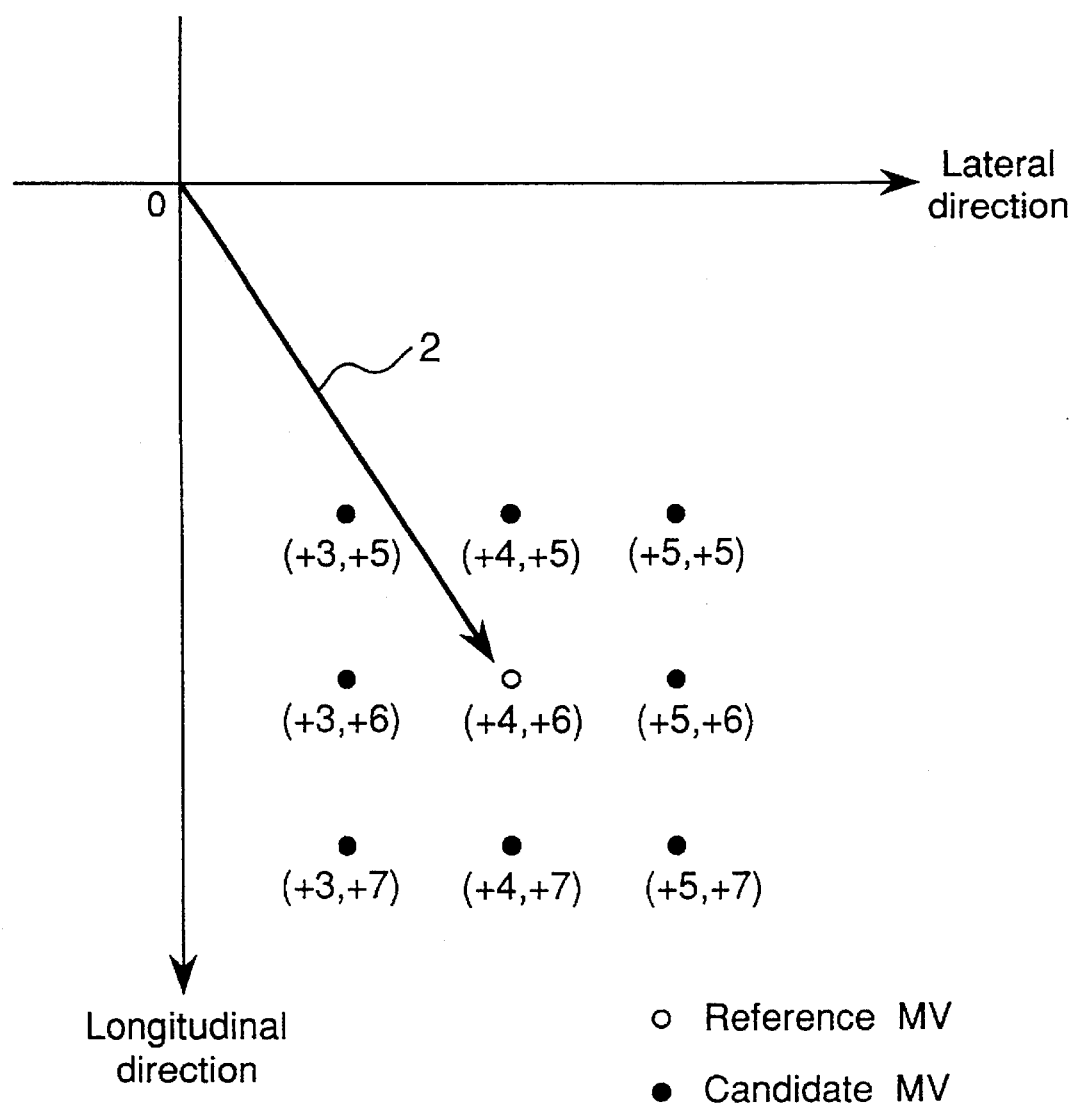
FIG. 4 is an explanatory view for showing a method for detecting a motion vector in H band.
Figure 5:
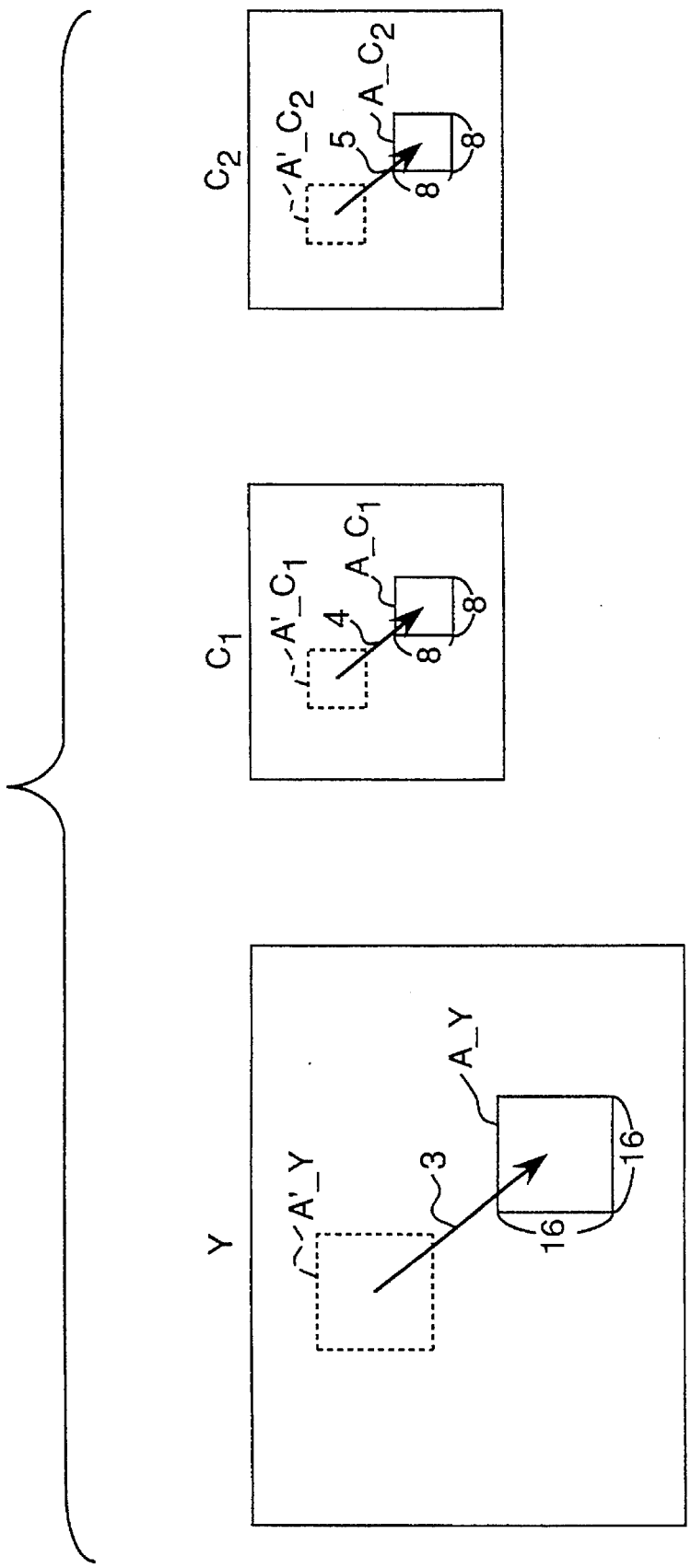
FIG. 5 is an explanatory view for showing a conventional method utilizing a motion vector detected with respect to a luminance signal to $C_1$ and $C_2$ frames.

FIG. 4 is used below to describe the method of detecting the motion vector of the H band according to the preferred embodiment of the invention.

To detect the motion vector, the image frame is divided into N blocks (where N is a natural number), and motion vector detection is applied to each of these blocks. The motion vector detection precision is one pixel. The LL:LH:HL:HH band ratio is 1:1:1:1. As a result, if the size of the LL band block is 16×16 pixels, the size of the LH, HL, and HH band blocks is also 16×16 pixels.

It is further assumed, for example, that the motion vector detected in the LL band indicates movement of +4 in the horizontal direction and +6 in the vertical direction. Because the LL:LH:HL:HH band ratio is 1:1:1:1, the reference motion vector in each H band will be the same size even if the motion vector obtained for the LL band is position-corrected for H band use. In other words, as shown in FIG. 4, the reference motion vector 2 in each H band will also indicate movement of +4 in the horizontal direction and +6 in the vertical direction. Candidate motion vectors are then set at eight adjacent points (±1 horizontally or vertically) around the reference motion vector 2. The correlations between the reference motion vectors 2 and the eight candidate motion vectors is then obtained between adjacent frames. The motion vector with the greatest correlation obtained as a result is defined as the motion vector of the H band.

The method of coding the H band motion vectors is described next.

The reference motion vector 2, which is the motion vector detected in the LL band position-corrected for H band use, is expressed by horizontal LLX and vertical LLY values. The motion vector detected in the LH band is expressed by horizontal LHX and vertical LHY values. Similarly, the HL and HH band vector values are respectively expressed as horizontal HLX, HHX and vertical HLY, HHY values. If the detected motion vectors were directly coded, the amount of added information would increase. Because the motion vectors of the H band take values ranging from −1 to +1 horizontally and −1 to +1 vertically relative to the reference motion vector 2, it is possible to obtain the difference between the motion vectors of the H band and the reference motion vector 2, and code the difference. This reduces the amount of added information. The differences in the motion vectors of the H band can be obtained by the following equations DLHX=LHX−LLX (−1≦DLHX≦+1)
DLHY=LHY−LLY (−1≦DLHY≦+1)
DHLX=HLX−LLX (−1≦DHLX≦+1)
DHLY=HLY−LLY (−1≦DHLY≦+1)
DHHX=HHX−LLX (−1≦DHHX≦+1)
DHHY=HHY−LLY (−1≦DHHY≦+1)

where DLHX and DLHY are the horizontal and vertical differences, respectively, in the LH band; DHLX and DHLY are the horizontal and vertical differences, respectively, in the HL band; and DHHX and DHHY are the horizontal and vertical differences, respectively, in the HH band.

As described above, when obtaining the H band motion vector, the motion vector obtained from the LL band block corresponding to the target block of the H band is used. When the pixel sizes of the LL band image frame and the H band image frame are the same, the motion vector obtained from the LL band block is used as the reference motion vector. When the pixel sizes are different, the motion vector obtained from the LL band block is position-corrected for H band use, and this position-corrected motion vector is used as the reference motion vector. Plural candidate motion vectors are then set around the reference motion vector in each H band, and the correlations between the reference motion vectors and the plural candidate motion vectors in adjacent frames are obtained. The motion vectors with the greatest correlation are then determined and defined as the motion vector of each H band. As a result, the motion vector of the H band can be more accurately detected, and the increase in the number of operations and the hardware scale can be reduced compared with H band motion vector detection methods applying the same method used to detect the LL band motion vector.

In addition, when coding the H band motion vector, the difference between the H band motion vector and the reference motion vector is obtained and the difference is coded, thereby reducing the amount of added information.

It is to be noted that the present invention shall not be limited to four frequency band divisions, a motion vector detection precision of one pixel, and eight candidate motion vectors as in the above embodiment, and numerous variations of these parameters are possible in accordance with the intent of the invention without being excluded from the scope of the invention.

In addition, the following motion vector detection and motion vector coding methods are also possible using the methods of the invention described above.

* A method using the motion vector of the luminance signal in the lowest horizontal and vertical frequency bands (Y_LL band) to detect the motion vectors of the luminance signals in the non-lowest horizontal and vertical frequency bands (Y_H bands); and a motion vector coding method which obtains the difference between the Y_H band motion vectors and the reference motion vector obtained from the Y_LL band, and codes this difference value when coding the Y_H band motion vectors.

* A method using the motion vector of the Y_LL band to detect the motion vector of the chrominance signal in the lowest horizontal and vertical frequency bands (C_LL band); and a motion vector coding method which obtains the difference between the C_LL band motion vector and the reference motion vector obtained from the Y_LL band, and codes this difference value when coding the C_LL band motion vector.

* A method using the motion vector of the Y_LL band to detect the motion vectors of the chrominance signals in the non-lowest horizontal and vertical frequency bands (C_H bands); and a motion vector coding method which obtains the difference between the C_H band motion vectors and the reference motion vector obtained from the Y_LL band, and codes this difference value when coding the C_H band motion vectors.

* A method using the C_LL band motion vector to detect the C_H band motion vectors; and a motion vector coding method which obtains the difference between the C_H band motion vectors and the reference motion vector obtained from the C_LL band, and codes this difference value when coding the C_H band motion vectors.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motion vector detection method for dividing the image frame into N blocks (where N is a natural number) and detecting the motion vectors between adjacent frames of each block, comprising steps of detecting a motion vector from a block of a luminance signal, defining a reference motion vector of a block of a chrominance signal corresponding to the block of the luminance signal in accordance with the motion vector detected in the foregoing step, setting plural candidate motion vectors around the reference motion vector, obtaining correlations between two blocks of adjacent frames for the reference motion vector and the plural candidate motion vectors, and defining a motion vector with the greatest correlation as the motion vector of the chrominance signal.

2. The motion vector detection method according to claim 1 wherein pixel sizes of the luminance signal image frame and the chrominance signal image frame are the same and the reference motion vector of the chrominance signal is the motion vector detected from the block of the luminance signal.

3. The motion vector detection method according to claim 1 wherein the pixel size of the chrominance signal image frame is different from that of the luminance signal and the reference motion vector of the chrominance signal is obtained by position-correcting the motion vector detected from the block of the luminance signal.

4. The motion vector detection method according to claim 1 wherein the number of candidate motion vectors is eight.

5. The motion vector detection method according to claim 1 further comprising a step of coding a difference between the motion vector of the chrominance signal and the reference motion vector.

* * * * *